US012792078B2

(12) United States Patent
Mori

(10) Patent No.: US 12,792,078 B2
(45) Date of Patent: Nov. 10, 2026

(54) JOYSTICK DEVICE

(71) Applicant: Waken Industries Inc., Osaka (JP)

(72) Inventor: Youichi Mori, Osaka (JP)

(73) Assignee: Waken Industries Inc., Osaka (JP)

( * ) Notice: Subject to any disclaimer, the term of this patent is extended or adjusted under 35 U.S.C. 154(b) by 0 days.

(21) Appl. No.: 19/282,072

(22) Filed: Jul. 28, 2025

(65) Prior Publication Data

US 2026/0044174 A1 Feb. 12, 2026

(30) Foreign Application Priority Data

Aug. 7, 2024 (JP) ................................ 2024-131255

(51) Int. Cl.
*G05G 9/047* (2006.01)

(52) U.S. Cl.
CPC .................................... *G05G 9/047* (2013.01)

(58) Field of Classification Search
CPC ............................................ G05G 2009/04718
See application file for complete search history.

(56) References Cited

U.S. PATENT DOCUMENTS

2021/0236919 A1* 8/2021 Endo ...................... H01H 25/04
2023/0266787 A1* 8/2023 Ito .......................... G05G 9/047
74/471 XY

FOREIGN PATENT DOCUMENTS

JP 4490945 B2 4/2010

* cited by examiner

*Primary Examiner* — Minnah L Seoh
*Assistant Examiner* — Gregory T Prather
(74) *Attorney, Agent, or Firm* — Kilyk & Bowersox, P.L.L.C.

(57) ABSTRACT

A joystick device configured such that an operating lever is pivotally tiltable in a first direction and a second direction orthogonal to the first direction. The joystick device includes the operating lever, a first operating shaft to allow the operating lever to pivotally tilt in the first direction, and a second operating shaft to allow the operating lever to pivotally tilt in the second direction. The operating lever is provided with the first operating shaft, and the first operating shaft is sandwiched in a yoke, and the yoke is provided with the second operating shaft. The yoke includes two yoke segments combined together. The yoke segments are formed with respective operating shaft portions constituting the second operating shaft. By combining the yoke segments having sandwiched therebetween the first operating shaft, the operating shaft portions become the second operating shaft orthogonal to the first operating shaft.

4 Claims, 10 Drawing Sheets

PRIOR ART

JOYSTICK DEVICE

CROSS-REFERENCE TO RELATED APPLICATIONS

The present application claims priority under 35 U.S. C. § 119 of Japanese Patent Application No. 2024-131255 filed on Aug. 7, 2024, the disclosure of which is expressly incorporated by reference herein in its entirety.

BACKGROUND OF THE INVENTION

Technical Field

The invention relates to joystick devices.

Background Art

A conventional joystick device for operating an arm of an excavator is configured to, for example, drive the arm of the excavator in front, back, left, and right directions by pivotally tilt an operating lever 700 in a first direction and a second direction orthogonal to the first direction.

As illustrated in FIGS. 9 and 10, the joystick device includes a yoke 710 to fittingly receive the operating lever 700, a lever shaft 720 to support the yoke 710 in a pivotally tiltable manner so as to allow the operating lever 700 to pivotally tilt in the first direction, and shafts 730 to allow the operating lever 700 to pivotally tilt in the second direction together with the yoke 710.

The yoke 710 is formed in a generally cylindrical shape as a whole. The yoke 710 is provided with an elongated throughhole 711, which extends through the yoke 710 from an upper face side to a lower face side thereof. The operating lever 700 fits in, and extends through, the elongated throughhole 711. A pair of throughholes 712 for the lever shaft open into the elongated throughhole 711 and face each other. The lever shaft 720 extends through the throughholes 712 for the lever shaft in a direction orthogonal to the direction in which the elongated throughhole 711 extends through the yoke 710.

With the operating lever 700 fitted in the elongated throughhole 711 of the yoke 710, the part of the operating lever 700 that is located in the elongated throughhole 711 is provided with an operation-lever-side throughhole 701. The lever shaft 720 is passed through the operation-lever-side throughhole 701.

Also, the yoke 710 is formed with shaft connection holes 713 in a direction orthogonal to the throughholes 712 for the lever shaft, the shafts 730 are connected into the respective shaft connection holes 713. Note that the shafts 730, provided as a pair of shafts 730, do not extend through the yoke 710, but fit in the respective opposing faces of the yoke 710. Accordingly, there are two shaft connection holes 713 at opposing positions.

The operating lever 700 is inserted into the elongated throughhole 711 of the yoke 710, and the operation-lever-side throughhole 701 of the operating lever 700 is brought into alignment with the throughholes 712 for the lever shaft of the yoke 710, and in this state, the lever shaft 720 is inserted into one of the throughholes 712 for the lever shaft, then into the operation-lever-side throughhole 701, and then into the other throughholes 712 for the lever shaft. Thus the operating lever 700 is coupled to the yoke 710.

Further, the shafts 730 are inserted into the respective shaft connection holes 713 of the yoke 710 to couple the shafts 730 to the yoke 710.

The operation-lever-side throughhole 701 and the shaft connection holes 713 are configured such as to be orthogonal to each other, that is, the lever shaft 720 and the shaft 730 are connected to the yoke 710 while maintaining their orientations that are orthogonal to each other. As such, the operating lever 700 fitted in the yoke 710 is pivotally tiltable in the first direction (a direction about the lever shaft 720) and the second direction (a direction about the shaft 730).

For retaining the lever shaft 720 received in the yoke 710, retaining rings 740 are press-fitted over end portions of the lever shaft 720. For retaining the shaft 730 coupled to the yoke 710, set screws 750 are connected to the shaft 730 via set-screw openings 715 in the yoke 710.

Among many such joystick devices, there exits Japanese U.S. Pat. No. 4,490,945 "joystick controller," for example.

The "joystick controller" is "a joystick controller comprising a housing case, a shaft being an operation body, a rotation support mechanism to support the shaft such that the shaft is pivotally tiltable relative to the housing case, and detection means to detect movement of the shaft in a first direction and movement of the shaft in a second direction and output a voltage corresponding to each of the movements, wherein the rotation supporting mechanism includes a hollow shaft to rotatably supports a lower end of the shaft with a supporting shaft, and a pair of fixing shafts to be rotatably fitted to opposite sides in an axial direction of the hollow shaft and support the hollow shaft in a rotatable manner, the pair of fixed shafts are fixed to the housing case, a first one of the detection means to detect the movement in the first direction includes a first magnet provided on the fixed shaft and a first magnetic sensor provided on the hollow shaft, a second one of the detection unit that detects the movement in the second direction includes a second magnet provided on the shaft and a second magnetic sensor provided on the hollow shaft, the shaft, the rotation supporting mechanism, and the detection means are collectively unitized into a mechanism-side unit separately provided from the housing case, two opposing side faces of the housing case are provided with respective female channels, and the rotation support mechanism of the mechanism-side unit is assembled to the two female channels such that the pair of fixing shafts fitted into the two female channels."

SUMMARY OF INVENTION

However, the above-described joystick device has the following problems.

First, the device requires a process of forming the elongated throughhole in the yoke.

Also, for the purpose of connecting the lever shaft to the yoke, it is required to form the throughholes for the lever shaft, in addition to the elongated throughhole, in the yoke, and to form the operation-lever-side throughhole in the operating lever.

Further, the retaining rings are required for fixing the lever shaft having passed through the operation-lever-side throughhole in the operating lever and through the pair of throughholes for the lever shaft in the yoke.

Also required are the set screws for coupling the shaft to the yoke.

In short, the use of a member formed in a generally cylindrical shape as the yoke requires a step of machining the elongated throughhole and a step of machining the throughholes for the lever shaft, and also requires a step of machining the operation-lever-side throughhole in the operating lever, resulting in the increased number of manufacturing steps.

Also, it is required to provide, in addition to the yoke and the operating lever, the lever shaft, the two retaining rings, the two shafts, and the at least two set screws, resulting in the increased number of components.

The large number of manufacturing steps and the large number of components are major causes of increased costs for this type of gimbal structures and eventually for joysticks employing such gimbal structures.

The invention has been made in view of the above circumstances, and an object of the invention is to provide a joystick device with a reduced number of components and accordingly a reduced number of steps of processing the components to simplify manufacturing steps and thereby achieve a significant cost reduction.

A joystick device according to an aspect of the invention is configured such that an operating lever is pivotally tiltable in a first direction and a second direction orthogonal to the first direction. The joystick device includes the operating lever, a first operating shaft to allow the operating lever to pivotally tilt in the first direction, and a second operating shaft to allow the operating lever to pivotally tilt in the second direction. The operating lever is provided with the first operating shaft, and the first operating shaft is sandwiched in a yoke. The yoke is provided with the second operating shaft. The yoke includes two yoke segments combined together. The yoke segments are formed with respective operating shaft portions constituting the second operating shaft. By combining the yoke segments having sandwiched therebetween the first operating shaft, the operating shaft portions become the second operating shaft orthogonal to the first operating shaft.

The yoke segments each include a fitting protrusion and a fitting recess. The fitting protrusion of one of the yoke segments is configured to fit in the fitting recess of the other yoke segment. By sandwiching the first operating shaft between the yoke segments and then rotating the yoke segments about the first operating shaft, the fitting protrusion is fitted in the fitting recess, and the yoke segments are combined together.

The yoke segments combined together are coupled to each other by means of a coupling pin to form the yoke.

Further, a joystick device according to another aspect of the invention is configured such that an operating lever is pivotally tiltable in a first direction and a second direction orthogonal to the first direction. The joystick device includes the operating lever, a first operating shaft to allow the operating lever to pivotally tilt in the first direction, and second operating shafts to allow the operating lever to pivotally tilt in the second direction. The operating lever is provided with the first operating shaft, and the first operating shaft is sandwiched in a yoke. The second operating shafts are attached to the yoke. The yoke includes two yoke segments combined together. The second operating shafts also serve to couple the two yoke segments to each other. With the two yoke segments combined together, the second operating shafts are attached to the respective yoke segments, and the yoke segments are thereby coupled to each other.

In the joystick device according to the invention, the yoke is constituted by a combination of the two yoke segments, obviating the need for the process of forming the elongated throughholes in the yoke.

In addition, for the purpose of connecting the lever shaft to the yoke, obviated is the need to form the elongated throughholes nor the throughholes for the lever shaft in the yoke, and the need to form the operation-lever-side throughholes in the operating lever.

Further, there is no need for any retaining rings for fixing the lever shaft having passed through the operation-lever-side throughhole in the operating lever and through the pair of throughholes for the lever shaft in the yoke.

Also obviated is the need for any set screws for coupling the shaft to the yoke.

In short, the use of a member formed in a generally cylindrical shape as the yoke does not require a step of machining the elongated throughhole nor a step of machining the throughholes for the lever shaft, nor require a step of machining the operation-lever-side throughhole in the operating lever, resulting in the reduced number of manufacturing steps.

As a result, it is possible to reduce the number of components as a whole and contribute to cost reduction.

Figure 1:
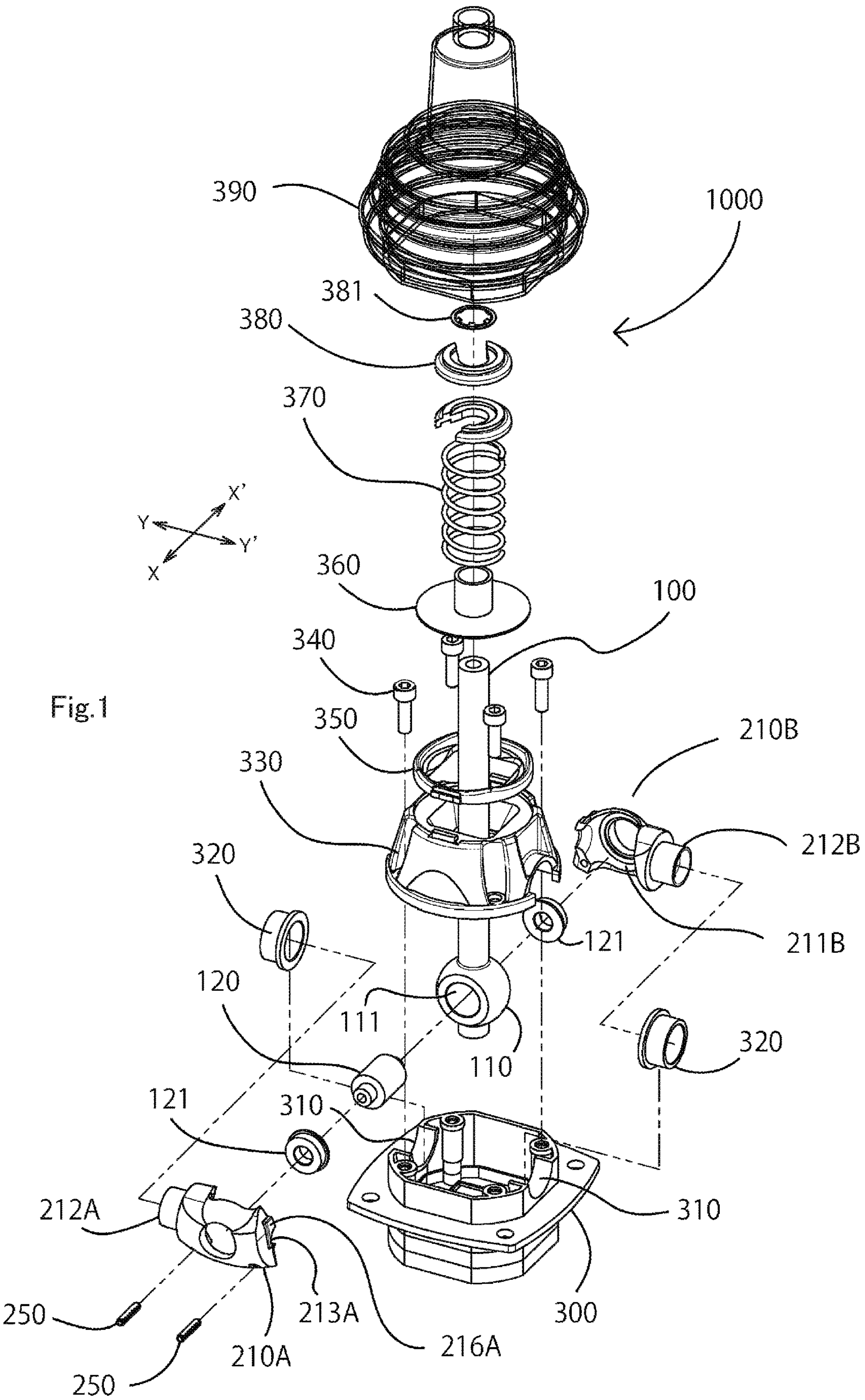
FIG. 1 is a schematic exploded perspective view of a joystick device according to a first embodiment of the invention.

In the brief description of the drawings above and the description of embodiments which follows, relative spatial terms such as "upper", "lower", "top", "bottom", "left", "right", "front", "rear", etc., are used for the convenience of the skilled reader and refer to the orientations of the joystick devices and their constituent parts as depicted in the drawings. No limitation is intended by use of these terms, either in use of the invention, during its manufacture, shipment, custody, or sale, or during assembly of its constituent parts or when incorporated into or combined with other apparatus.

DESCRIPTION OF EMBODIMENTS

A joystick device 1000 according to a first embodiment of the invention is configured such that an operating lever 100 is pivotally tiltable in a first direction α and a second direction β orthogonal to the first direction α. The joystick device 1000 includes: the operating lever 100; a first operating shaft 120 to allow the operating lever 100 to pivotally tilt in the first direction α; and a second operating shaft 212 to allow the operating lever 100 to pivotally tilt in the second direction β. The operating lever 100 is provided with the first operating shaft 120. The first operating shaft 120 is sandwiched in a yoke 200. The yoke 200 is provided with the second operating shaft 212. The yoke 200 includes two yoke segments 210A and 210B having an identical shape and being combined together. The yoke segments 210A and 210B are formed with respective operating shaft portions 212A and 212B constituting the second operating shaft 212. By combining the yoke segments 210A and 210B having sandwiched therebetween the first operating shaft 120, the operating shaft portions 212A and 212B become the second operating shaft 212 orthogonal to the first operating shaft 120.

Figure 4B:
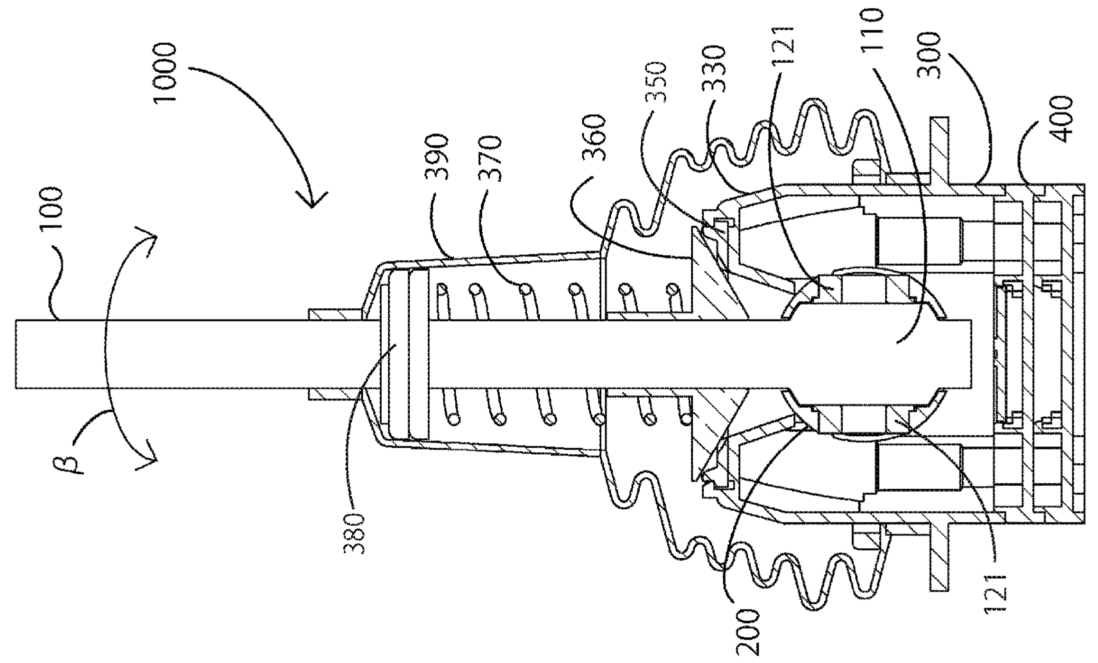
FIG. 4B is a schematic cross-sectional view, illustrating a second direction, of the joystick device according to the first embodiment of the invention.
Figure 4A:
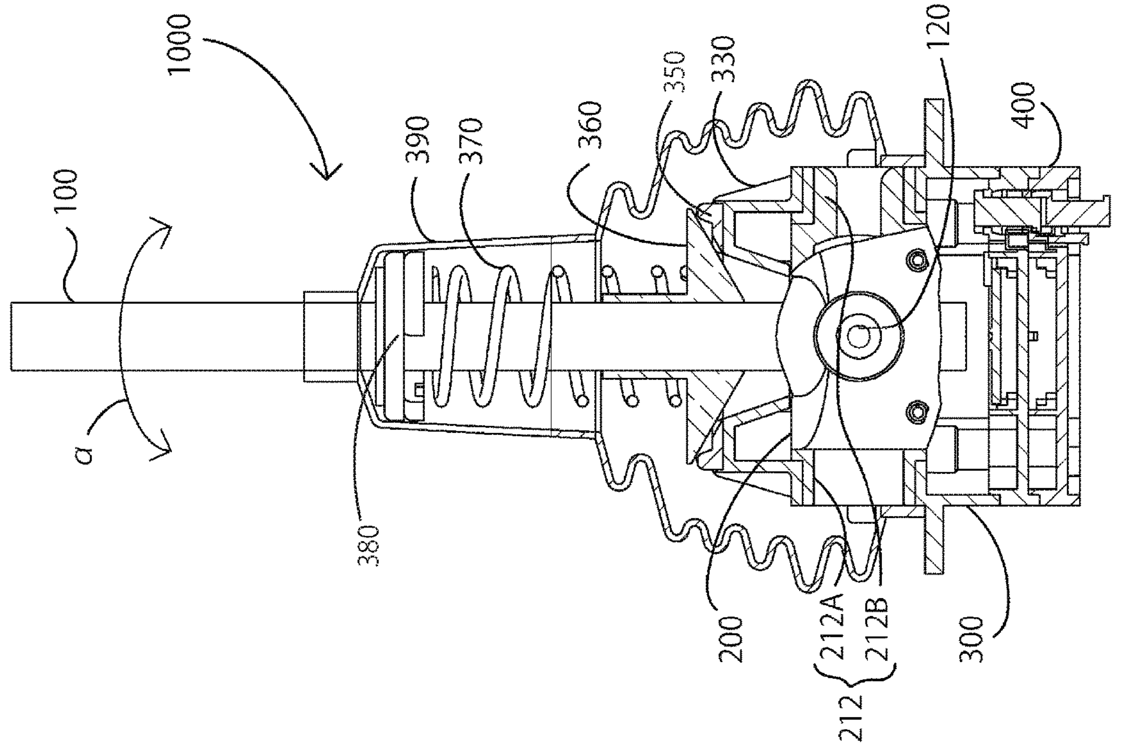
FIG. 4A is a schematic cross-sectional view, illustrating a first direction, of the joystick device according to the first embodiment of the invention.

As used herein, the first direction α means a direction of pivotal movement about the first operating shaft 120 as illustrated in FIG. 4A, the second direction β means a direction pivotal movement about the second operating shaft 212 as illustrated in FIG. 4B, and the first direction α is orthogonal to the second direction β.

As used herein, an X-X' direction is a first axial direction of the first operating shaft 120 and orthogonal to the first direction α. The X-X' direction includes an X direction (one side in the first axial direction) and an X' direction (the other side in the first axial direction). A Y-Y' direction is a second axial direction of the second operating shaft 212 (the operating shaft portions 212A and 212B) and orthogonal to the X-X' direction and the second direction β. The Y-Y' direction includes a Y direction (one side in the second axial direction) and a Y' direction (the other side in the second axial direction).

Figure 2:
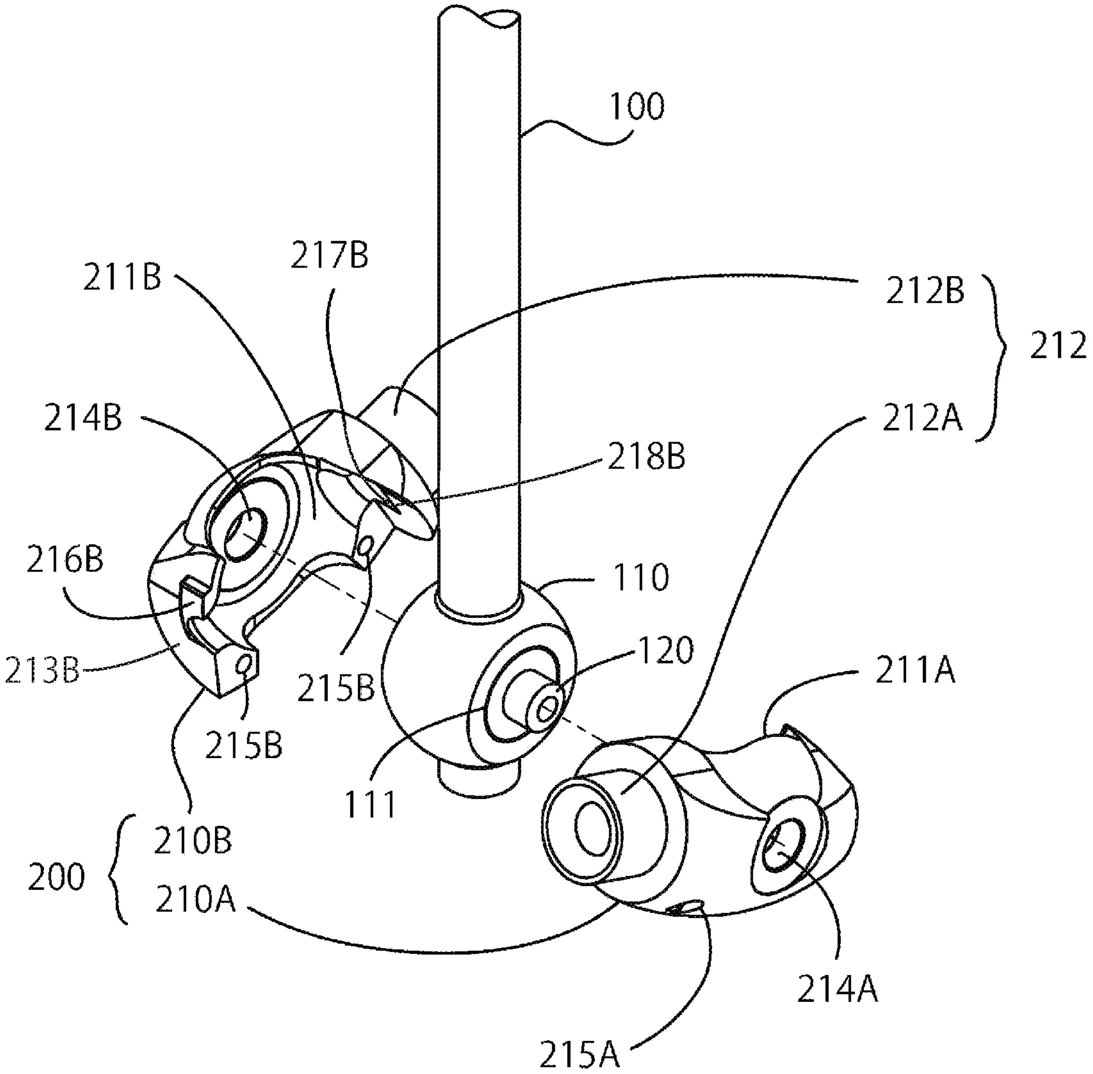
FIG. 2 is a schematic exploded perspective view illustrating a relationship between an operating lever and a yoke of the joystick device according to the first embodiment of the invention.

As illustrated in FIG. 2, etc., the operating lever 100 is formed on its proximal end side with a generally circular ball 110. The ball 110 is formed with a throughhole 111. The first operating shaft 120, which is to allow the operating lever 100 to pivotally tilt in the first direction, is fittingly received in the throughhole 111 together with first flange bushes 121.

The first operating shaft 120 includes a shaft main portion and the two first flange bushes 121. The shaft main portion is a generally circular-section column extending in the X-X' direction and extending through the throughhole 111 of the operating lever 100. The shaft main portion includes a first end portion, which protrudes in the X direction out of the throughhole 111, and a second end portion, which protrudes in the X' direction out of the throughhole 111. The first end portion of the shaft main portion is fitted in one of the two first flange bushes 121. The first end portion of the shaft main portion and the one first flange bush 121 form "a first end portion of the first operating shaft 120." The second end portion of the shaft main portion is fitted in the other first flange bush 121, and the second end portion of the shaft main portion and the other first flange bush 121 form "a second end portion of the first operating shaft 120."

As illustrated in FIGS. 1 and 2, the two yoke segments 210A and 210B (first and second yoke segments) constituting the yoke 200 have an identical shape and are combined so as to sandwich the ball 110 therebetween. The two yoke segments 210A and 210B are formed with recessed portions 211A and 211B, respectively, for the ball. The recessed portions 211A and 211B for the ball are generally hemispherical so as to fittingly receive respective halves of the ball 110. By combining the two yoke segments 210A and 210B, formed between the two yoke segments 210A and 210B is a space to fittingly receive the ball 110.

The yoke segments 210A and 210B are combined together in the X-X' direction.

The yoke segment 210A includes a first portion, a second portion, a third portion, and the recessed portion 211A for the ball. The first portion projects in the X' direction from an end on the Y-direction side of the third portion and includes a first outer face on the Y-direction side and a first inner face on the Y'-direction side. The second portion projects in the X' direction from an end on the Y'-direction side of the third portion and includes a second outer face 213A on the Y'-direction side. The recessed portion 211A for the ball is defined by the first, second, and third portions and recessed in the X direction.

The yoke segment 210B includes a first portion, a second portion, a third portion, and the recessed portion 211B for the ball. The first portion projects in the X direction from an end on the Y'-direction side of the third portion and includes a first outer face on the Y'-direction side and a first inner face on the Y-direction side. The second portion projects in the X direction from an end on the Y-direction side of the third portion and includes a second outer face 213B on the Y-direction side. The recessed portion 211B for the ball is defined by the first, second, and third portions and recessed in the X' direction.

The yoke segments 210A and 210B are provided with the operating shaft portions 212A and 212B (first and second operating shaft portions) projecting to one side. The operating shaft portions 212A and 212B constitute the second operating shaft 212 and are of cylindrical shape.

The operating shaft portion 212A projects in the Y direction from the first outer face of the yoke segment 210A. The operating shaft portion 212A is fittingly received in one of two second flange bushes 320. The operating shaft portion 212A and the one second flange bush 320 form "a first end portion of the second operating shaft 212." The operating shaft portion 212B projects in the Y' direction from the first outer face of the yoke segment 210B. The operating shaft portion 212B is fittingly received in the other second flange bush 320. The operating shaft portion 212B and the other second flange bush 320 form "a second end portion of the second operating shaft 212."

In addition, the recessed portions 211A and 211B for the ball are provided with throughholes 214A and 214B for the operating shaft. The throughholes 214A and 214B for the operating shaft has a circular shape. Further, the first flange bushes 121 and the first operating shaft 120 fittingly received therein pass through the respective throughholes 214A and 214B for the operating shaft.

The ball 110 is rotatably fitted in the recessed portions 211A and 211B for the ball, and the first and second end portions of the first operating shaft 120 are pivotally fitted in the respective throughholes 214A and 214B for the operating shaft. Thus the yoke segments 210A and 210B are combined together, and the ball 110 and the first operating shaft 120 are sandwiched between the yoke segments 210A and 210B.

Furthermore, of the two yoke segments 210A and 210B, the yoke segment 210A is provided with two pin receiving holes 215A, and the yoke segment 210B is provided with two pin receiving holes 215B. The pin receiving holes 215A and 215B are arranged in parallel with the first operating shaft 120. The pin receiving holes 215A and 215B receive coupling pins 250 for coupling the two yoke segments 210A and 210B in a combined state to form the yoke 200.

The pin receiving hole 215A extends through the yoke segment 210A in the X-X' direction. The pin receiving hole 215B extends through the yoke segment 210B in the X-X' direction.

Of the two yoke segments 210A and 210B, a fitting protrusion 216A (a first fitting protrusion) protrudes outwardly of a side of the yoke segment 210A that is opposite to the side where the operating shaft portion 212A is provided, and a fitting protrusion 216B (a second fitting protrusion) protrudes outwardly of a side of the yoke segment 210B that is opposite to the side where the operating shaft portion 212B is provided.

The fitting protrusion 216A projects in the Y' direction from the second outer face 213A of the yoke segment 210A. The fitting protrusion 216B projects in the Y direction from the second outer face 213B of the yoke segment 210B.

Of the two yoke segments 210A and 210B, a fitting recess 217A (a first fitting recess) is formed in an inner face of the yoke segment 210A that is closer to the operating shaft portion 212A, that is, in the inner face of the recessed portion 211A for the ball, and a fitting recess 217B (a second fitting recess) is formed in an inner face of the yoke segment 210B that is closer to the operating shaft portion 212B, that is, in the inner face of the recessed portion 211B for the ball.

The fitting recess 217A is provided in the first inner face of the first portion of the yoke segment 210A and recessed in the Y direction. The fitting recess 217B is provided in the first inner face of the first portion of the yoke segment 210B and recessed in the Y' direction.

The fitting protrusions 216A and 216B are to be fit in the fitting recesses 217B and 217A, respectively. When the fitting protrusions 216A and 216B fit into the fitting recesses 217B and 217A, the two yoke segments 210A and 210B are combined into the yoke 200.

In addition, in order to allow the fitting protrusion 216A smoothly fit into the fitting recess 217B, the fitting recess 217B is formed with a sliding face 218B. In order to allow the fitting protrusion 216B smoothly fit into the fitting recess 217, the fitting recess 217A is formed with a sliding face 218A. Note that FIG. 1 shows the fitting protrusion 216A only, and FIG. 2 shows the fitting protrusion 216B, the fitting recess 217B, and the sliding face 218B only.

The sliding face 218A is a curved face recessed in the Y direction. An upper end of the sliding face 218A is located on the Y-direction side relative to, and spaced from, the first inner face of the first portion of the yoke segment 210A, while a lower end of the sliding face 218A is contiguous with the first inner face of the first portion of the yoke segment 210A. The sliding face 218B is a curved face recessed in the Y' direction. An upper end of the sliding face 218B is located on the Y'-direction side relative to, and spaced from, the first inner face of the first portion of the yoke segment 210B, while a lower end of the sliding face 218B is contiguous with the first inner face of the first portion of the yoke segment 210B.

The two yoke segments 210A and 210B thus configured are combined into the yoke 200 in the steps now described with reference to FIGS. 1, 3, etc.

First, the ball 110 is sandwiched from opposite sides between the two yoke segments 210A and 210B. At this time, the first operating shaft 120 passes through the first throughholes 214A and 214B for the operating shaft of the two yoke segments 210A, 210B. Thus the ball 110 fits into the space defined by the recessed portions 211A and 211B for the ball of the two yoke segments 210A and 210B.

Figures 3A, 3B, 3C:
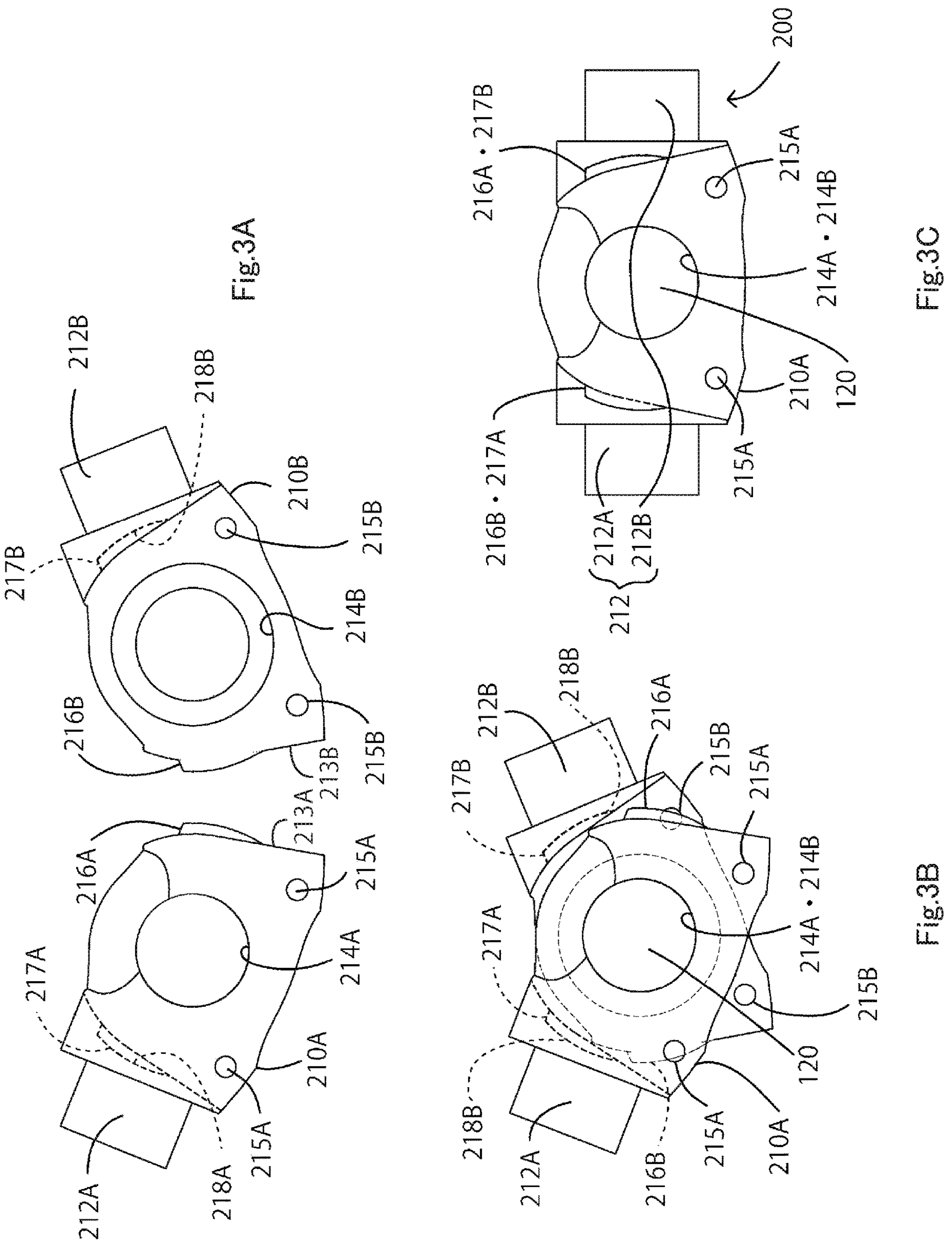
FIG. 3A is a schematic front view illustrating how to combine two yoke segments of the yoke of the joystick device according to the first embodiment of the invention, as viewed from the side of the yoke segment 210A, and illustrating a state before the yoke segments are combined together.
FIG. 3B is a schematic front view illustrating how to combine the two yoke segments of the yoke of the joystick device according to the first embodiment of the invention, as viewed from the side of the yoke segment 210A, and illustrating a state where the yoke segments are being combined together.
FIG. 3C is a schematic front view illustrating how to combine the two yoke segments of the yoke of the joystick device according to the first embodiment of the invention, as viewed from the side of the yoke segment 210A, and illustrating a state where the yoke segments have been combined together.

At this time, as illustrated in FIGS. 3A and 3B, relative to one of the yoke segments, namely the yoke segment 210A, the other yoke segment 210B is inclined by about 40° and fitted into the ball 110, and then the two yoke segments 210A and 210B are rotated about the first operating shaft 120. In other words, in a state where the yoke segments 210A and 210B sandwich therebetween the ball 110 and the first operating shaft 120, the other yoke segment 210B is arranged in the inclined orientation relative to the one yoke segment 210A so that the fitting protrusions 216A and 216B are located below the fitting recesses 217B and 217A, respectively. Thereafter the yoke segments 210A and 210B are relatively rotated, with the first and second end portions of the first operating shaft 120 serving as a pivot. Through this rotation, the fitting protrusion 216A of the yoke segment 210A slides on the sliding face 218B of the other yoke segment 210B and then fits into the fitting recess 217B, and the fitting protrusion 216B of the yoke segment 210B slides on the sliding face 218A of the yoke segment 210A and then fits into the fitting recess 217A. As a result of fitting the fitting protrusion 216A of the one yoke segment 210A into the fitting recess 217B of the other yoke segment 210B and fitting the fitting protrusion 216B of the other yoke segment 210B into the fitting recess 217A of the one yoke segment 210A, the two yoke segments 210A and 210B are combined as illustrated in FIG. 3C.

As illustrated in FIG. 3C, the operating shaft portions 212A and 212B of the two yoke segments 210A and 210B are arranged in a straight line to become the second operating shaft 212. The second operating shaft 212 and the first operating shaft 120 are orthogonal to each other.

However, in this state, the two yoke segments 210A and 210B are not coupled to each other, but the fitting protrusions 216A and 216B simply fit in the fitting recesses 217B and 217A, respectively, to combine the two yoke segments 210A and 210B. Therefore, the two yoke segments 210A and 210B are easy to get separated from each other.

The coupling pins 250 are used to firmly fix the two, easily separable yoke segments 210A and 210B to form the yoke 200. In a state where the two yoke segments 210A and 210B are combined, the pin receiving holes 215A of the yoke segment 210A coincide with the respective pin receiving holes 215B of the yoke segment 210B. By inserting the coupling pins 250 into the pin receiving holes 215A and 215B, the two yoke segments 210A and 210B are fixed (are coupled) in a combined state to become the yoke 200.

As illustrated in FIG. 1, with the yoke 200 attached to the ball 110 of the operating lever 100, the operating lever 100 is fitted into a case base 300. The case base 300 is formed with base-side receiving portions 310 to receive the second operating shaft 212, around which the second flange bushes 320 are fitted. In other words, the first and second end portions of the second operating shaft 212 are rotatably supported in the respective two base-side receiving portions 310 of the case base 300. As a result, as illustrated in FIGS. 4A and 4B, the operating lever 100 is pivotally tiltable in the first direction α (the direction in which the operating lever 100 is pivotally tiltable about the first operating shaft 120) and the second direction β (the direction in which the operating lever 100 is pivotally tiltable about the second operating shaft 212) orthogonal to the first direction α. Thus the operating lever 100 is pivotally tiltable from a neutral position (to be described) in any directions about the operating lever 100. The tiltable directions include one side in the first direction α, the other side in the first direction α, one side in the second direction β, the other side in the second direction β, a combined direction of the one side in the first direction α and the one side in the second direction β, a combined direction of the one side in the first direction α and the other side in the second direction β, a combined direction of the other side in the first direction α and the one side in the second direction β, and a combined direction of the other side in the first direction α and the other side in the second direction β.

Further, the operating lever 100 is passed through a case cover 330 and, in this state, the case cover 330 is coupled to the case base 300 by means of bolts 340. An operation force ring 350 and a restoring member 360 are fitted over the operating lever 100, a compression spring 370 is disposed on the restoring member 360, and the compression spring 370 is fixed by a spring seat 380 and a retaining ring 381. The restoring member 360 is slidable along the operating lever 100. The spring seat 380 and the retaining ring 381 are fixed to the operating lever 100 and spaced from the restoring member 360. The compression spring 370 is held in a compressed state between the restoring member 360 and the spring seat 380. The compression spring 370 presses an inverted-cone-shaped lower face of the restoring member 360 onto an inner rim of the operation force ring 350 on the case cover 330, so that the operating lever 100 is maintained at the neutral position.

Then, a boot 390, which is constituted by a flexible material, is placed over a region between the case cover 330 and the retaining ring 381. The operating lever 100 projects through an opening at the top of the boot 390. The boot 390 serves to prevent the yoke 200, the compression spring 370 above the yoke 200, and other components against dust in order to ensure reliable operation of the joystick device 1000.

When the operating lever 100 configured as described above is tilted in any of the tiltable directions described above and then the force applied to the operating lever 100 is removed, the operating lever 100 is returned to the neutral position (the position at which the operating lever 100 stands upright) automatically by the compression spring 370.

This automatic return function is achieved by the configuration that, as illustrated in FIGS. 4A and 4B, the lower face of the restoring member 360 is formed in an inverted conical shape, this face in the inverted conical shape rests on the operation force ring 350, and the compression spring 370 applies downward pressure to the operation force ring 350 via the restoring member 360.

Provided directly below the lowermost end of the operating lever 100 is a pivotal tilt detector 400 for detecting whether and how much the operating lever 100 has been pivotally tilted in the first direction α and the second direction β. The pivotal tilt detector 400 may also be configured to detect whether and how much the operating lever 100 has been tilted to the one side in the first direction α, the other side in the first direction α, the one side in the second direction β, the other side in the second direction β, the combined direction of the one side in the first direction α and the one side in the second direction β, the combined direction of the one side in the first direction α and the other side in the second direction β, the combined direction of the other side in the first direction α and the one side in the second direction β, and the combined direction of the other side in the first direction α and the other side in the second direction β. The pivotal tilt detector 400 may selected from ones of various configurations, such as one using a magnet (or magnets) and Hall elements.

Next, a joystick device 2000 according to a second embodiment of the invention will now be described. The joystick device 2000 has the same configurations as those of the joystick device 1000 according to the first embodiment, except that the joystick device 2000 includes a yoke 500 and two second operating shafts 600 having different configurations from those of the yoke 200 and the second operating shaft 212 of the joystick device 1000. As such, in the following description of the joystick device 2000, the same components as those of the joystick device 1000 according to the first embodiment will be denoted by the same reference numerals.

The joystick device 2000 is configured such that the operating lever 100 is pivotally tiltable in the first direction α and the second direction β orthogonal to the first direction α. The joystick device 1000 includes: the operating lever 100; a first operating shaft 120 to allow the operating lever 100 to pivotally tilt in the first direction α; and the second operating shafts 600 configured to allow the operating lever 100 to pivotally tilt in the second direction β. The operating lever 100 is provided with the first operating shaft 120. The first operating shaft 120 is sandwiched in the yoke 500. The second operating shafts 600 are attached to the yoke 500. The yoke 500 includes two yoke segments 510A and 510B having an identical shape and being combined together. The second operating shafts 600 also serve to couple the yoke segments 510A and 510B together. With the yoke segments 510A and 510B combined together, the second operating shafts 600 are attached to the respective yoke segments 510A and 510B, and the yoke segments 510A and 510B are thereby coupled to each other.

Figure 6:
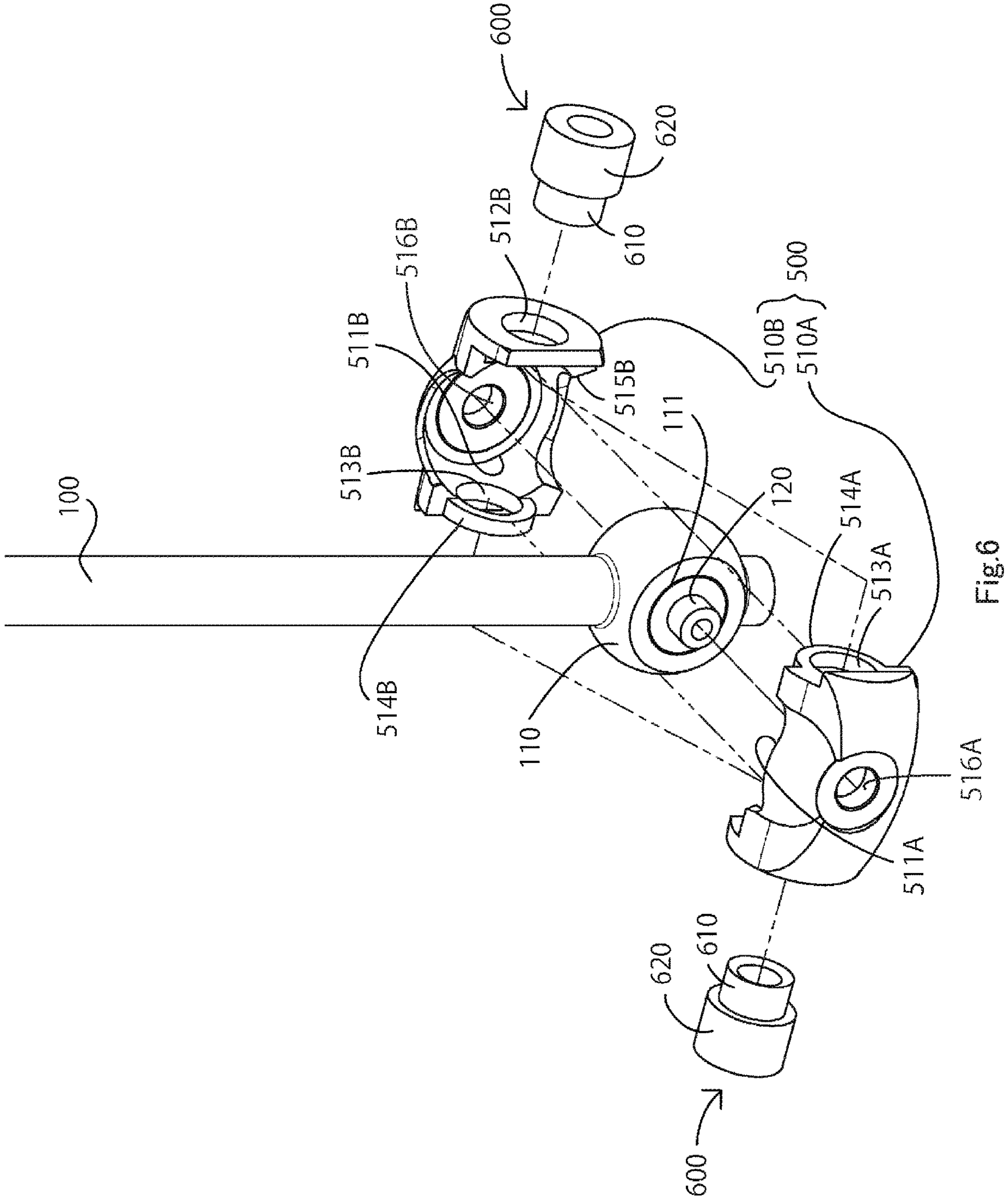
FIG. 6 is a schematic exploded perspective view illustrating a relationship between an operating lever and a yoke of the joystick device according to the second embodiment of the invention.
Figure 7C:
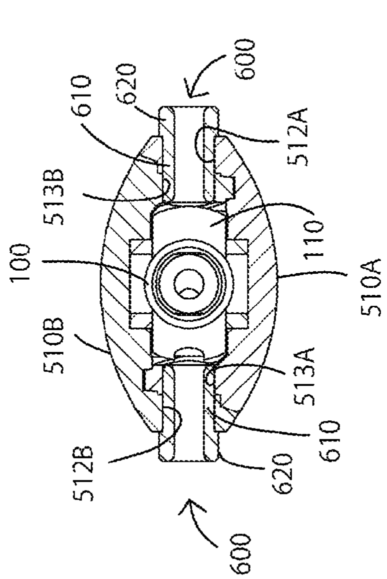
FIG. 7C is a schematic cross-sectional view, taken along line 7C-7C in 7A, of the joystick device according to the second embodiment of the invention.
Figure 7A:
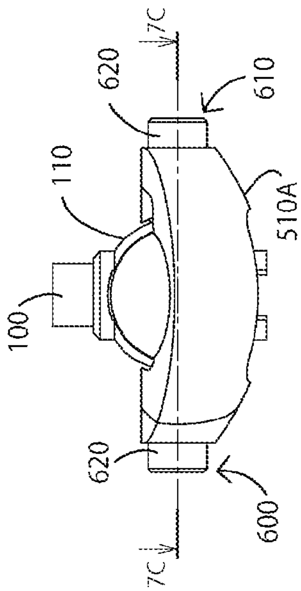
FIG. 7A is a schematic front view of the yoke of the joystick device according to the second embodiment of the invention.
Figure 7D:
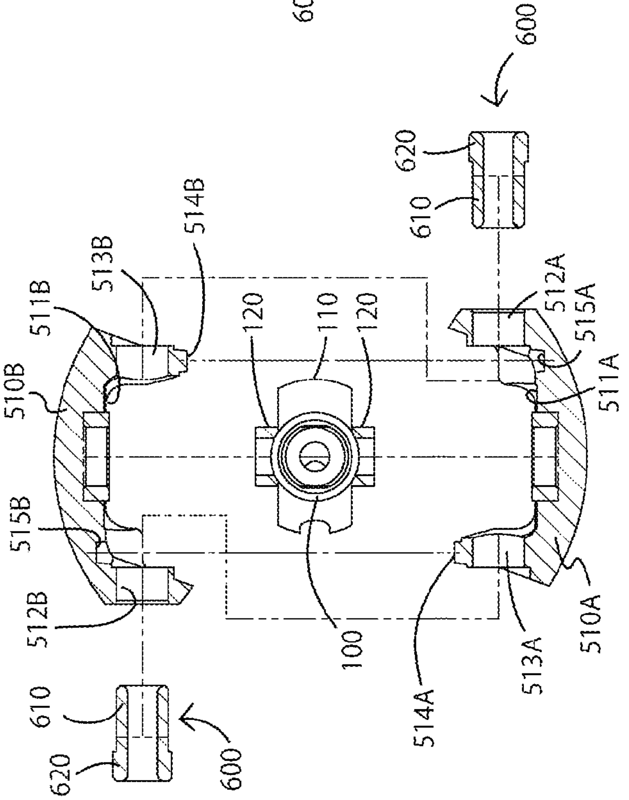
FIG. 7D is a schematic cross-sectional view, taken along line 7D-7D in 7B, of the yoke of the joystick device according to the second embodiment of the invention.
Figure 7B:
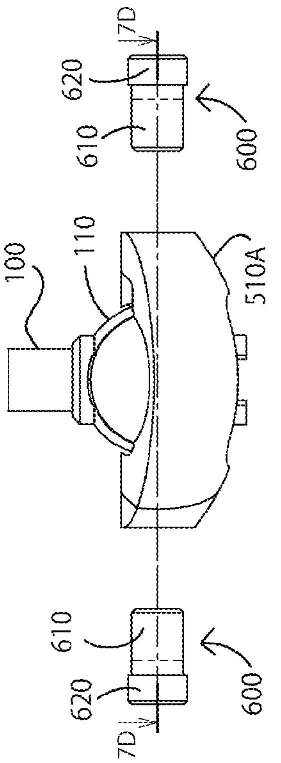
FIG. 7B is a schematic front view of the yoke of the joystick device according to the second embodiment of the invention, illustrating a state before second operating shafts are coupled to the yoke.

As illustrated in FIG. 6, etc., the operating lever 100 is formed on its proximal end side with the generally circular ball 110. The ball 110 is formed with the throughhole 111. The first operating shaft 120, which is configured to allow the operating lever 100 to pivotally tilt in the first direction α, is fittingly received in the throughhole 111 together with first flange bushes 121.

Figure 5:
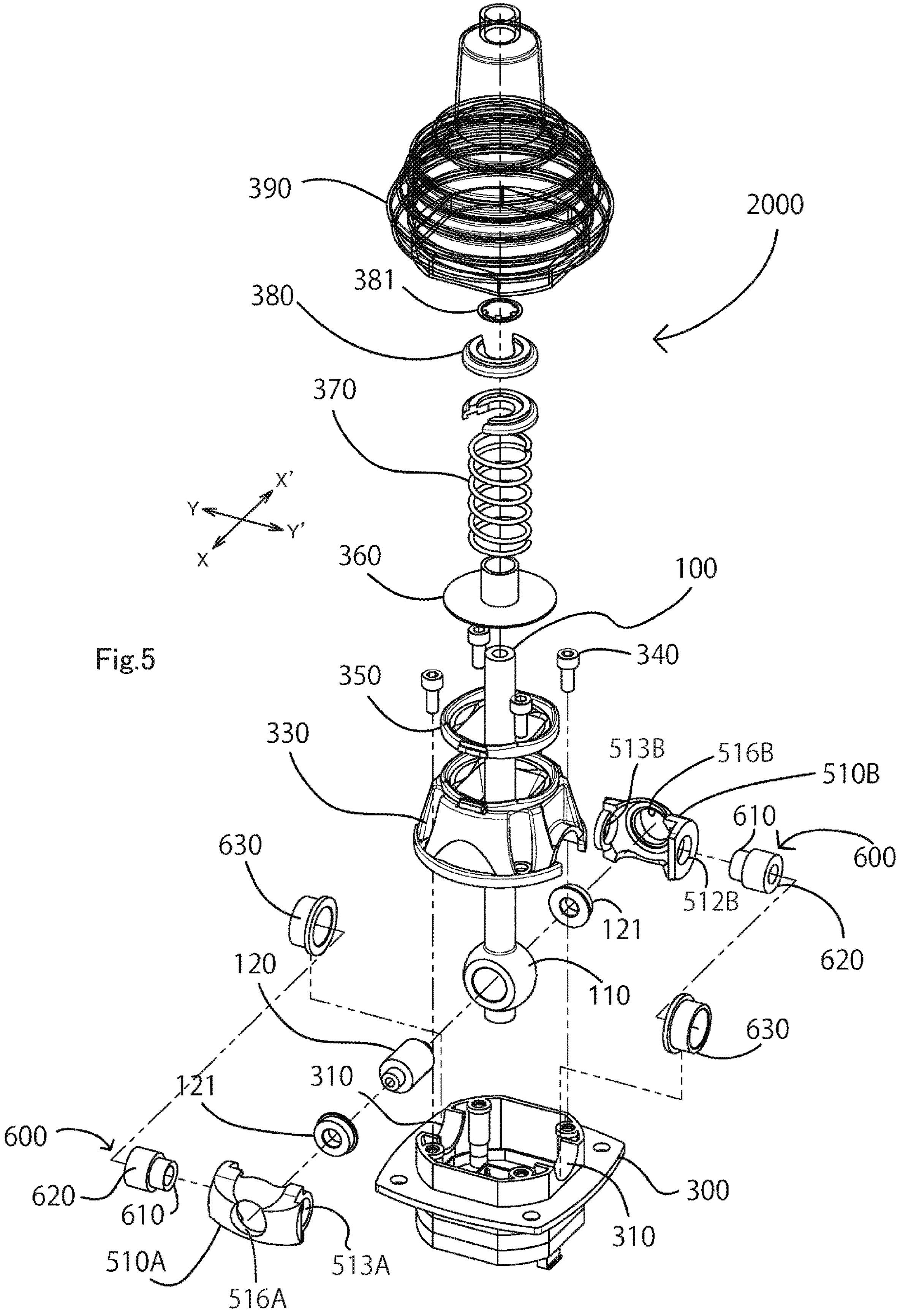
FIG. 5 is a schematic exploded perspective view of a joystick device according to a second embodiment of the invention.

The yoke 500 includes the two yoke segments 510A and 510B. As illustrated in FIGS. 5 and 6, the two yoke segments 510A and 510B constituting the yoke 500 have an identical shape and are combined so as to sandwich the ball 110 therebetween. The two yoke segments 510A and 510B are formed with recessed portions 511A and 511B, respectively, for the ball. The recessed portions 511A and 511B for the ball are generally hemispherical so as to fittingly receive respective halves of the ball 110. By combining the two yoke segments 510A and 510B, formed between the two yoke segments 510A and 510B is a space to fittingly receive the ball 110.

The recessed portion 511A for the ball of the yoke segment 510A is provided with an outer shaft receiving hole 512A on one side and an inner shaft receiving hole 513A on the other side. The recessed portion 511B for the ball of the yoke segment 510B is provided with an outer shaft receiving hole 512B on one side and an inner shaft receiving hole 513B on the other side.

The yoke segments 511A and 511B are combined together in the X-X' direction.

The yoke segment 510A has the same configuration as the yoke segment 210A except the following respects. The recessed portion 511A for the ball is defined by first, second, and third portions of the yoke segment 510A and recessed in the X direction. The first portion of the yoke segment 510A is provided with the outer shaft receiving hole 512A through the first portion in the Y-Y' direction. The second portion of the yoke segment 510A is provided with the inner shaft receiving hole 513A through the second portion in the Y-Y' direction. The third portion of the yoke segment 510A is provided with a throughhole 516A for the operating shaft configured similarly to the throughhole 214A for the operating shaft.

The yoke segment 510B has the same configuration as the yoke segment 210B except the following respects. The recessed portion 511B for the ball is defined by first, second, and third portions of the yoke segment 510B and recessed in the X' direction. The first portion of the yoke segment 510B is provided with the outer shaft receiving hole 512B extending through the first portion in the Y-Y' direction. The second portion of the yoke segment 510B is provided with the inner shaft receiving hole 513B extending through the second portion in the Y-Y' direction. The third portion of the yoke segment 510B is provided with a throughhole 516B for the operating shaft configured similarly to the throughhole 214B for the operating shaft.

The ball 110 is rotatably fitted in the recessed portions 511A and 511B for the ball of the yoke segments 510A and 510B, and the first and second end portions of the first operating shaft 120 are pivotally fitted in the respective throughholes 516A and 516B for the operating shaft of the yoke segments 510A and 510B. Thus the yoke segments 510A and 510B are combined together and sandwich therebetween the ball 110 and the first operating shaft 120. In this state, the first portion of the yoke segment 510A abuts the second portion of the yoke segment 510B from the Y-direction side, and the first portion of the yoke segment 510B abuts the second portion of the yoke segment 510A from the Y'-direction side.

When the two yoke segments 510A and 510B sandwich the ball 110 therebetween, located inside the outer shaft receiving holes 512A and 512B are the inner shaft receiving holes 513B and 513A, respectively. The outer shaft receiving holes 512A and 512B are of equal diameter to the inner shaft receiving holes 513A and 513B. The outer shaft receiving hole 512A and the inner shaft receiving hole 513B are to fittingly receive one of the two second operating shafts 600, and the outer shaft receiving hole 512B and the inner shaft receiving hole 513A are to fittingly receive the other second operating shafts 600.

Portions around the inner shaft receiving holes 513A and 513B of the yoke segments 510A and 510B also serve as positioning protrusions 514A and 514B. One of the yoke segments, namely the yoke segment 510A, is formed with a positioning recess 515A, which is located at a position corresponding to the inner shaft receiving hole 513B when the yoke segment 510A is combined with the other yoke segment 510B. Likewise, the other yoke segment 510B is formed with a positioning recess 515B, which is located at a position corresponding to the inner shaft receiving hole 513A serving as a positioning protrusion of the one yoke segment 510A.

The inner shaft receiving holes 513A and 513B, as well as the outer shaft receiving holes 512B and 512A, are to fittingly receive respective coupling portions 610 of the second operating shafts 600.

The inner shaft receiving hole 513A of the yoke segment 510A includes a generally ring-shaped perimeter portion, and an arc-shaped portion on the X'-direction side of the perimeter portion serves as the positioning protrusion 514A. The positioning recess 515A is provided in an inner face of the third portion of the yoke segment 510A. The positioning recess 515A is an arc-shaped recess recessed in the X direction. The inner shaft receiving hole 513B of the yoke segment 510B includes a generally ring-shaped perimeter portion, and an arc-shaped portion on the X-direction side of the perimeter portion serves as the positioning protrusion 514B. The positioning recess 515B is provided in an inner face of the third portion of the yoke segment 510B. The positioning recess 515B is an arc-shaped recess recessed in the X' direction. In a state where the yoke segments 510A and 510B are opposed to each other in the X-X' direction (in an opposed state before the combination), the positioning recess 515A is opposed to the positioning protrusion 514B, and the positioning recess 515B is opposed to the positioning protrusion 514A.

When the two yoke segments 510A and 510B sandwich the ball 110 therebetween, the positioning recesses 515A and 515B fittingly receive the positioning protrusions 514B and 514A, respectively. By virtue of the positioning recesses 515A and 515B and the corresponding positioning protrusions 514B and 514A, the two yoke segments 510A and 510B are set in position.

The second operating shafts 600 also serve to couple the two yoke segments 510A and 510B to each other as combined while sandwiching the ball 110 therebetween. As illustrated in FIGS. 6 and 7A-7D, the second operating shafts 600 are formed integrally with the coupling portions 610, which are to fit in the outer shaft receiving holes 512A and 512B and the inner shaft receiving holes 513B and 513A, and support portions 620, which are positioned outside the corresponding coupling portions 610 and have a larger diameter than the coupling portions 610.

The coupling portion 610 of one of the second operating shafts 600 is fittingly received in the outer shaft receiving hole 512A and the inner shaft receiving hole 513B, and the support portion 620 of the one second operating shaft 600 abuts a perimeter portion of the outer shaft receiving hole 512A from the Y-direction side. The coupling portion 610 of the other second operating shaft 600 is fittingly received in the outer shaft receiving hole 512B and the inner shaft receiving hole 513A, and the support portion 620 of the other second operating shaft 600 abuts a perimeter portion of the outer shaft receiving hole 512B from the Y'-direction side.

With the two yoke segments 510A and 510B combined while sandwiching the ball 110 therebetween, one of the coupling portions 610 is press-fitted through the outer shaft receiving hole 512A and into the inner shaft receiving hole 513B, and the other coupling portion 610 is press-fitted through the outer shaft receiving hole 512B and into the inner shaft receiving hole 513A. At this time, the support portions 620 of the second operating shafts 600 are not press-fitted into the respective outer shaft receiving holes 512A and 512B. This is because the support portions 620 are so designed to have a larger diameter than the respective outer shaft receiving holes 512A and 512B. The above-described second operating shafts 600 couple the two yoke segments 510A and 510B to each other in a combined state. Second flange bushes 630 are fitted around the respective support portions 620 of the second operating shafts 600.

As illustrated in FIG. 5, with the yoke 500 attached to the ball 110 of the operating lever 100, the operating lever 100 is fitted into the case base 300. The case base 300 is formed with the base-side receiving portions 310 to receive the respective second operating shafts 600 fitting in the respective second flange bushes 630. As a result, as illustrated in FIGS. 8A and 4B, the operating lever 100 is pivotally tiltable in the first direction α (the direction in which the operating lever 100 is pivotally tiltable about the first operating shaft 120) and the second direction β (the direction in which the operating lever 100 is pivotally tiltable about the second operating shaft 212) orthogonal to the first direction α.

Further, the operating lever 100 is passed through the case cover 330 and, in this state, the case cover 330 is coupled to the case base 300 by means of the bolts 340. The operation force ring 350 and the restoring member 360 are fitted over the operating lever 100, the compression spring 370 is disposed on the restoring member 360, and the compression spring 370 is fixed by the spring seat 380 and the retaining ring 381.

Then, the boot 390, which is constituted by a flexible material, is placed over a region between the case cover 330 and the retaining ring 381. The operating lever 100 projects through the opening at the top of the boot 390. The boot 390 serves to prevent the yoke 200, the compression spring 370 above the yoke 200, and other components against dust in order to ensure reliable operation of the joystick device 2000.

When the operating lever 100 configured as described above is tilted in any of the tiltable directions and then the force applied to the operating lever 100 is removed, the operating lever 100 is returned to the neutral position (the position at which the operating lever 100 stands upright) automatically by the compression spring 370.

Figure 8B:
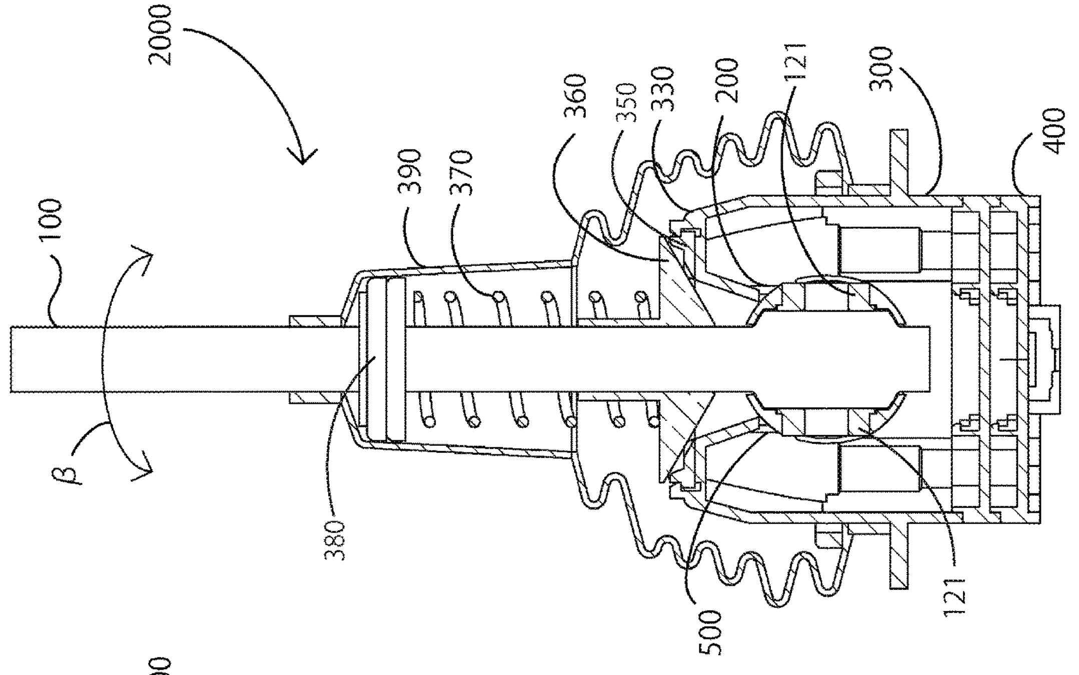
FIG. 8B is a schematic cross-sectional view, illustrating a second direction, of the joystick device according to the second embodiment of the invention.
Figure 8A:
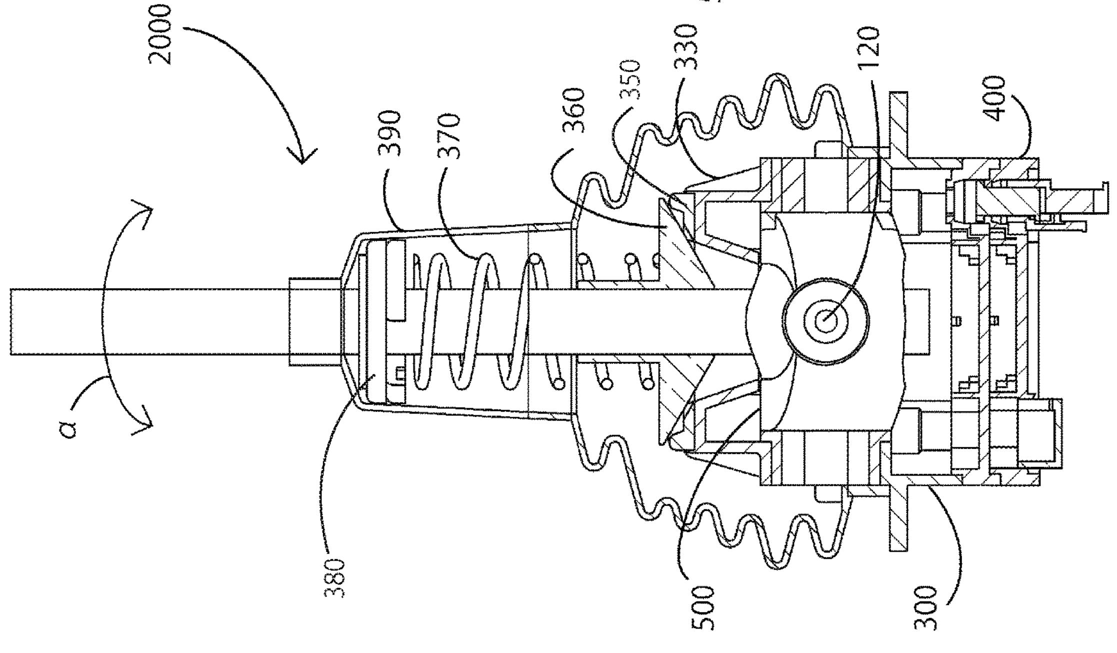
FIG. 8A is a schematic cross-sectional view, illustrating a first direction, of the joystick device according to the second embodiment of the invention.
Figure 9:
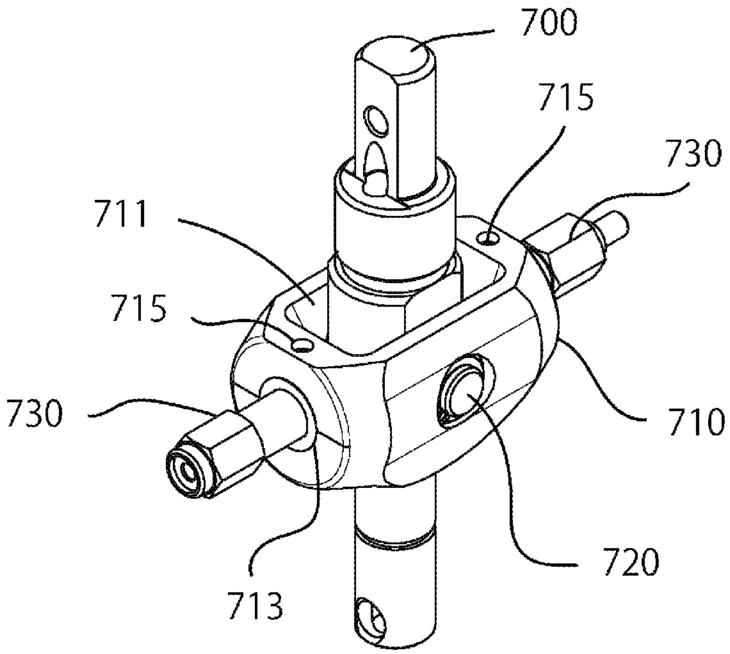
FIG. 9 is a schematic perspective view of a yoke and an operating lever incorporated therein of a conventional joystick device of this type.
Figure 10:
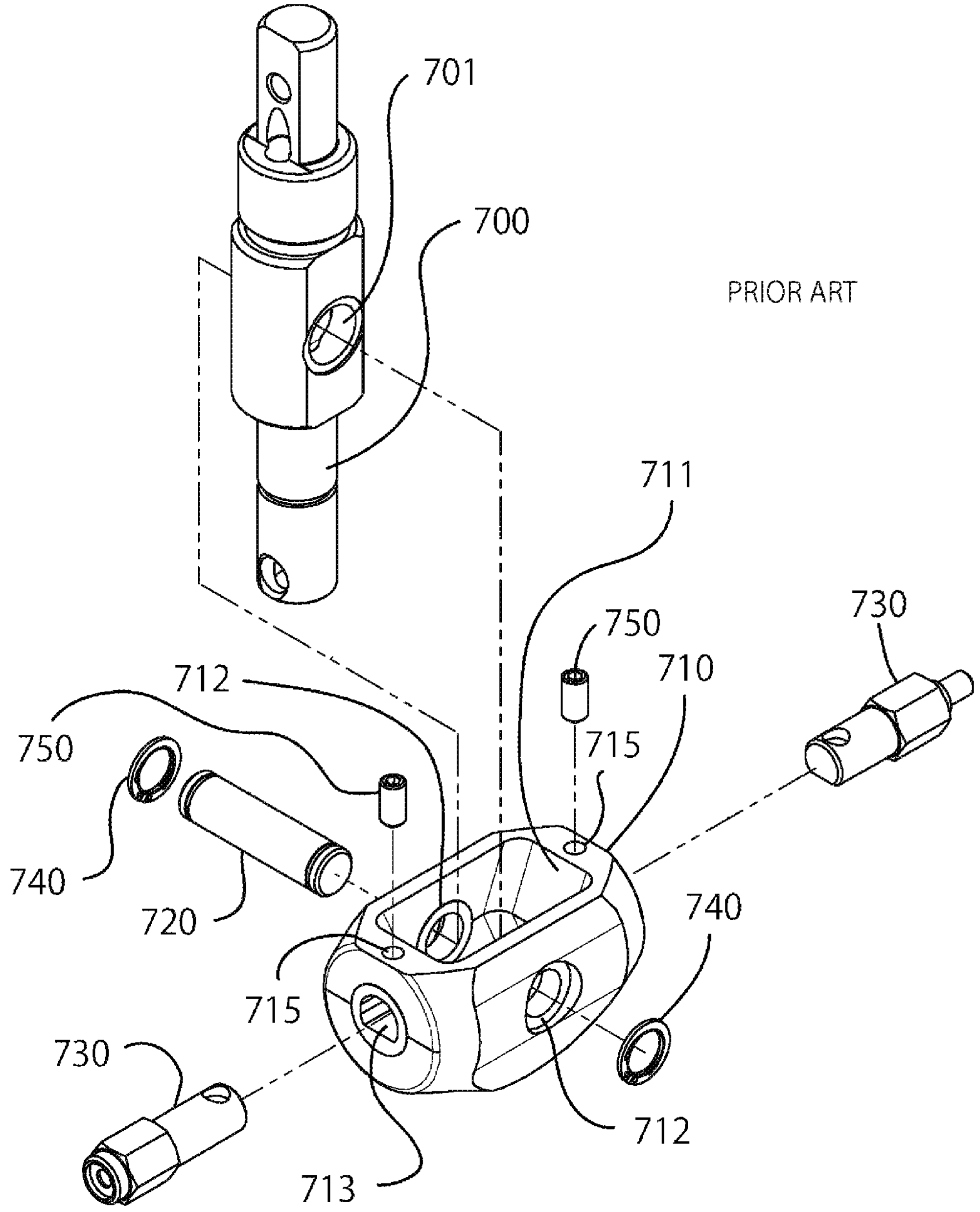
FIG. 10 is a schematic exploded perspective view of the yoke and the operating lever to be incorporated therein of the conventional joystick device of this type.

This automatic return function is achieved by the configuration that, as illustrated in FIGS. 8A and 8B, the lower face of the restoring member 360 is formed in an inverted conical shape, this face in the inverted conical shape rests on the operation force ring 350, and the compression spring 370 applies downward pressure to the operation force ring 350 via the restoring member 360.

Provided immediately below the lowermost end of the operating lever 100 is the pivotal tilt detector 400 for detecting whether and how much the operating lever 100 has been pivotally tilted in the first direction α and the second direction β.

The pivotal tilt detector 400 may selected from ones of various configurations, such as one using a magnet (or magnets) and Hall elements.

Note that the joystick devices 1000 and 2000 according to the above-described embodiments are for operating an arm of an excavator, for example, but the joystick device according to the invention is not limited thereto. The invention is also applicable to shift levers of automobiles, pan heads for cameras, optical devices, etc., and yokes installed in support parts for propellers, rotors, etc., of aircrafts.

The two yoke segments 510A and 510B are not required to have an identical shape, but may have any configuration that allows combining the yoke segments with the first operating shaft sandwiched therebetween.

The ball 110 of the operating lever 100 and the recessed portions 211A and 211B for the ball of the yoke segments 210A and 210B may be omitted. Likewise, the ball 110 of the operating lever 100 and the recessed portions 511A and 511B for the ball of the yoke segments 510A and 510B may be omitted. In either case, all that is required is that the shaft main portion of the first operating shaft 120 extends through the operating lever 100 in the X-X' direction, and that the two yoke segments (the yoke segments 210A and 210B or the yoke segments 510A and 510B) are respectively provided with first and second shaft holes. The first shaft hole may extend through one of the two yoke segments as in one of the throughholes for the operating shaft described above, but may be a blind hole provided in an inner face of the one yoke segment and recessed in the X direction in which the first end portion of the first operating shaft 120 is pivotally fitted. Where the one yoke segment includes the first portion, the second portion, and the third portion, the first shaft hole may be provided in the third portion of the one yoke segment. The second shaft hole may extend through the other yoke segment as in the other throughhole for the operating shaft described above, but may be a blind hole provided in an inner face of the other yoke segment and recessed in the X' direction in which the second end portion of the first operating shaft 120 is pivotally fitted. Where the other yoke segment includes the first portion, the second portion, and the third portion, the second shaft hole may be provided in the third portion of the other yoke segment.

The first flange bushes 121 of the first operating shaft 120 may be omitted. In this case, the first end portion of the shaft main portion of the first operating shaft 120 forms "the first end portion of the first operating shaft 120," and the second end portion of the shaft main portion of the first operating shaft 120 forms "the second end portion of the first operating shaft 120." The second flange bushes 320 of the second operating shaft 212 may be omitted. In this case, the operating shaft portion 212A forms "the first end portion of the second operating shaft 212," and the operating shaft portion 212B forms "the second end portion of the second operating shaft 212." The pin receiving holes 215A and 215B of the yoke segments 210A and 210B and the coupling pins 250 may be omitted.

REFERENCE SIGNS LIST

100: operating lever
120: first operating shaft
200: yoke
210A, 210B: yoke segment
212: second operating shaft
212A, 212B: operating shaft portion
1000: joystick device

What is claimed is:

1. A joystick device configured such that an operating lever is pivotally tiltable in a first direction and a second direction orthogonal to the first direction, the joystick device comprising:

the operating lever;

a first operating shaft to allow the operating lever to pivotally tilt in the first direction; and second operating shafts to allow the operating lever to pivotally tilt in the second direction, wherein the operating lever is provided with the first operating shaft, and the first operating shaft is sandwiched in a yoke, the second operating shafts are attached to the yoke, the yoke includes two yoke segments combined together, the second operating shafts also serve to couple the yoke segments to each other, and with the yoke segments combined together, the second operating shafts are attached to the respective yoke segments, and the yoke segments are thereby coupled to each other.

2. The joystick device according to claim 1, wherein the first operating shaft includes a first end portion on one side in a first axial direction of the first operating shaft and a second end portion on the other side in the first axial direction, the first axial direction being orthogonal to the first direction, the yoke segments include first and second yoke segments combined together in the first axial direction, the first yoke segment further includes a first shaft hole, the first shaft hole is a throughhole extending through the first yoke segment in the first axial direction or alternatively a blind hole provided in an inner face of the first yoke segment and recessed to the one side in the first axial direction, and the first end portion of the first operating shaft is pivotally fitted in the first shaft hole, the second yoke segment further includes a second shaft hole, the second shaft hole is a throughhole extending through the second yoke segment in the first axial direction or alternatively a blind hole provided in an inner face of the second yoke segment and recessed to the other side in the first axial direction, and the second end portion of the first operating shaft is pivotally fitted in the second shaft hole, the second operating shafts are provided separately from the first and second yoke segments and include one of the second operating shafts and the other second operating shaft, and second axial direction of the second operating shafts is orthogonal to the second direction and the first axial direction, and the one second operating shaft is attached to the first and second yoke segments from the one side in the second axial direction, the other second operating shaft is attached to the first and second yoke segments from the other side in the second axial direction, and thereby the first and second yoke segments are coupled to each other.

3. The joystick device according to claim 2, wherein the operating lever includes a ball, the first operating shaft extends through the ball in the first axial direction, the first yoke segment further includes a first portion, a second portion, a third portion, and a recessed portion for the ball, the first portion of the first yoke segment projects to the other side in the first axial direction from an end on the one side in the second axial direction of the third portion of the first yoke segment, the second portion of the first yoke segment projects to the other side in the first axial direction from an end on the other side in the second axial direction of the third portion of the first yoke segment, the third portion of the first yoke segment is provided with the first shaft hole, and the recessed portion for the ball of the first yoke segment is defined by the first, second, and third portions of the first yoke segment and recessed to the one side in the first axial direction, the second yoke segment further includes a first portion, a second portion, a third portion, and a recessed portion for the ball, the first portion of the second yoke segment projects to the one side in the first axial direction from an end on the one side in the second axial direction of the third portion of the second yoke segment, the second portion of the second yoke segment projects to the one side in the first axial direction from an end on the other side in the second axial direction of the third portion of the second yoke segment, the third portion of the second yoke segment is provided with the second shaft hole, and the recessed portion for the ball of the second yoke segment is defined by the first, second, and third portions of the second yoke segment and recessed to the other side in the first axial direction, in a state where the first and second yoke segments are combined together, the ball is rotatably received in the recessed portion for the ball of the first yoke segment and the recessed portion for the ball of the second yoke segment, and the first and second end portions of the first operating shaft are pivotally fitted respectively in the first and second shaft holes.

4. The joystick device according to claim 3, wherein the first yoke segment further includes an outer shaft receiving hole and an inner shaft receiving hole, the outer shaft receiving hole of the first yoke segment extends through the first portion of the first yoke segment in the second axial direction, and the inner shaft receiving hole of the first yoke segment extends through the second portion of the first yoke segment in the second axial direction, the second yoke segment further includes an outer shaft receiving hole and an inner shaft receiving hole, the outer shaft receiving hole of the second yoke segment extends through the first portion of the second yoke segment in the second axial direction, and the inner shaft receiving hole of the second yoke segment extends through the second portion of the second yoke segment in the second axial direction, the first portion of the first yoke segment abuts the second portion of the second yoke segment from the one side in the second axial direction, and the outer shaft receiving hole of the first yoke segment is located on the one side in the second axial direction relative to the inner shaft receiving hole of the second yoke segment, the first portion of the second yoke segment abuts the second portion of the first yoke segment from the other side in the second axial direction, and the outer shaft receiving hole of the second yoke segment is located on the other side in the second axial direction relative to the inner shaft receiving hole of the first yoke segment, and in a state where the first and second yoke segments are combined together, the one second operating shaft is fittingly received in the outer shaft receiving hole of the first yoke segment and the inner shaft receiving hole of the second yoke segment from the one side in the second axial direction, and the other second operating shaft is fittingly received in the outer shaft receiving hole of the second yoke segment and the inner shaft receiving hole of the first yoke segment from the other side in the second axial direction.

* * * * *